UNITED STATES PATENT OFFICE.

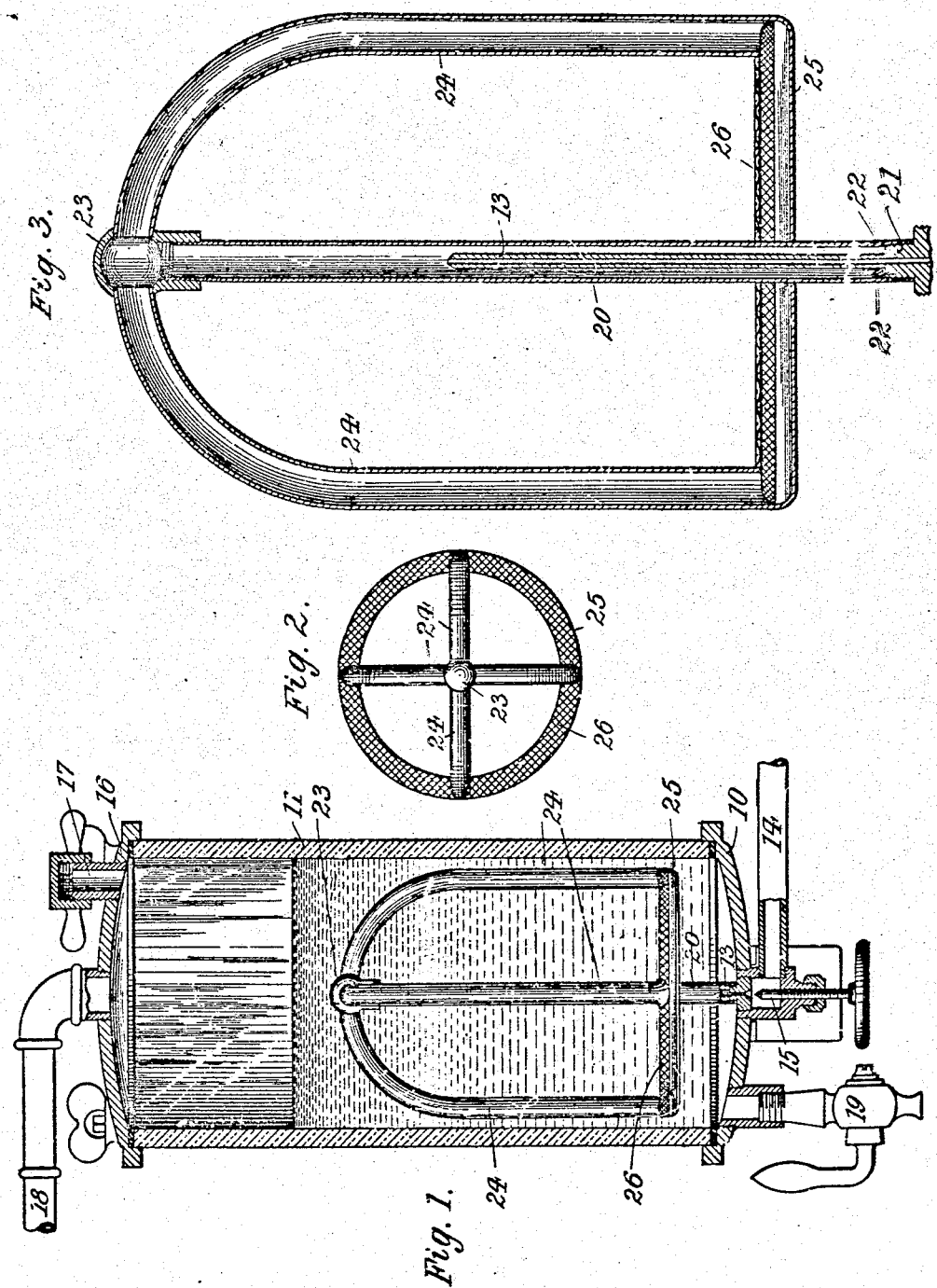

CARL GUNTRUM, OF BROOKLYN, NEW YORK.

AIR-FILTER.

972,184. Specification of Letters Patent. Patented Oct. 11, 1910.

Application filed February 11, 1910. Serial No. 543,234.

*To all whom it may concern:*

Be it known that I, CARL GUNTRUM, a citizen of the United States, residing at Brooklyn, county of Kings, and State of New York, have invented new and useful Improvements in Air-Filters, of which the following is a specification.

This invention relates to an air filter of novel construction, in which an air jet is first subjected to an induced current of a cleansing liquid and is then subdivided into bubbles rising through said liquid. In this way the air is thoroughly cleaned, so that it is well adapted for the manufacture of food products, and for sanitary, chemical and other uses.

In the accompanying drawing: Figure 1 is a vertical longitudinal section, partly in elevation, of my improved air filter; Fig. 2 a plan of the mixer, and Fig. 3 a detail longitudinal section thereof.

From the bottom 10 of a suitable vessel 11 projects an injector nozzle 13 which receives the air to be filtered from an air inlet pipe 14 controlled by needle valve 15. Head 16 of vessel 11 is provided with an inlet nozzle 17 for the introduction of the filtering solution and with an outlet pipe 18 for the purified air, while the spent solution is discharged through an outlet cock 19 of bottom 10.

Upon nozzle 13 is fitted a mixer through which the air jet, together with an induced stream of the filtering solution, is caused to flow before the air is discharged into the main body of such solution.

The mixer is shown to consist of a central upright pipe 20 supported by a foot 21 of nozzle 13 and of a diameter to form a liquid passage around said nozzle, the liquid from vessel 11 being admitted into said passage through inlet orifices 22. The upper end of pipe 20 carries a socket 23 from which radiate the upper curved ends of a cluster of branch pipes or downwardly extending sections 24 arranged around pipe 20. Pipes 24 are shorter than pipe 20, and their lower ends carry a joint annular outlet pipe 25, within which pipe 20 is centered. Annular pipe 25 is perforated or screened, as at 26, for the joint egress of air and liquid from the mixer into the body of liquid contained in vessel 11. It will be seen that the mixer constructed as described, comprises an article complete in itself, which may be readily secured in position by being slipped over foot 21.

In practice, the air admitted under pressure into nozzle 13 will induce an inflow of liquid through orifices 22 into pipe 20. This mixture of air and liquid will be caused to rise through pipe 20 into socket 23, where the stream is subdivided, and thence descends through the different flanking pipes 24, into the annulus 25. During this flow along the tortuous course described, the air will be placed into such prolonged and intimate contact with the purifying liquid, that a thorough cleansing of the air is effected, the main bulk of the impurities carried by the air being taken up by the liquid. From pipe 25, the air and liquid are discharged into vessel 11, near the bottom thereof. As the air passes through screen 26, it will be finely comminuted, rising in the form of small bubbles through the main body of the liquid in vessel 11. In this way a further effective filtration of the air takes place, so that it arrives in a thoroughly purified state within the upper part of vessel 11, from which it may be drawn through pipe 18.

It is obvious that the peculiar form of the mixer may be changed without departing from the spirit of the invention, its object being to insure a tortuous passage for the joint flow of the air and liquid, and for the discharge of the air into the liquid vessel below the liquid level thereof.

I claim:

1. An air filter comprising a liquid vessel, an inclosed air nozzle, a surrounding liquid pipe which communicates with the vessel at one end, a branch extending from the other end of said pipe into the vessel below the liquid level thereof, and an apertured outlet pipe communicating with said branch.

2. An air filter, comprising a liquid vessel, an inclosed air nozzle, an apertured liquid pipe which communicates with said nozzle, a plurality of branch pipes communicating with the liquid pipe, and a screened outlet pipe communicating with the branch pipes.

3. An air filter, comprising a liquid vessel, an inclosed air nozzle, an apertured liquid pipe which communicates with said nozzle, a plurality of branch pipes communicating with the upper end of the liquid pipe, and a screened annular outlet pipe communicating with the lower ends of the branch pipes.

CARL GUNTRUM.

Witnesses:
 FRANK V. BRIESEN,
 EDWARD SCHORR.